(12) United States Patent
Tjader

(10) Patent No.: US 11,125,377 B2
(45) Date of Patent: *Sep. 21, 2021

(54) PIPE SPLITTING APPARATUS WITH CABLE ENGAGEMENT SYSTEM

(71) Applicant: TT Technologies, Inc., Aurora, IL (US)

(72) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,933

(22) Filed: Oct. 17, 2018

(65) Prior Publication Data

US 2019/0049058 A1 Feb. 14, 2019

Related U.S. Application Data

(63) Continuation of application No. 15/490,988, filed on Apr. 19, 2017, now Pat. No. 10,139,031, which is a continuation of application No. 14/275,385, filed on May 12, 2014, now Pat. No. 9,631,763, which is a continuation of application No. 12/897,552, filed on Oct. 4, 2010, now Pat. No. 8,721,223.

(60) Provisional application No. 61/248,753, filed on Oct. 5, 2009.

(51) Int. Cl.
*F16L 55/18* (2006.01)
*F16L 55/165* (2006.01)

(52) U.S. Cl.
CPC ........... *F16L 55/18* (2013.01); *F16L 55/1658* (2013.01)

(58) Field of Classification Search
CPC .................................................. F16L 55/1658
See application file for complete search history.

(56) References Cited

U.S. PATENT DOCUMENTS

| | | |
|---|---|---|
| 2,166,457 A | 7/1939 | Berndt |
| 3,524,227 A | 8/1970 | Kelly |
| 3,776,586 A | 12/1973 | Ahlgren |
| 3,868,748 A | 3/1975 | Kelly |
| 4,674,914 A | 6/1987 | Wayman et al. |
| 4,690,262 A | 9/1987 | Hoyle |

(Continued)

OTHER PUBLICATIONS

"U.S. Appl. No. 12/897,552, Advisory Action dated Sep. 18, 2013", 3 pgs.

(Continued)

*Primary Examiner* — Tara Mayo-Pinnock
(74) *Attorney, Agent, or Firm* — Schwegman Lundberg & Woessner, P.A.

(57) ABSTRACT

Pipe splitting apparatuses and systems including a replaceable blade, and methods therefor, are provided. In various examples, a cable retention and release mechanism is configured to releasably engage a cable and includes one or more segments of a pipe splitting apparatus including a cable passage. A segmented collet includes tapered segments and is disposed within a tapered portion of a cable passage of the one or more segments. Channel surfaces of the tapered segments together form a cable channel through the segmented collet. The cable channel is configured to widen in a disengaged position of the segmented collet and narrow in an engaged position of the segmented collet. A spring is disposed within the spring pocket of the one or more segments to bias the segmented collet distally in the engaged position.

12 Claims, 7 Drawing Sheets

(56) References Cited

U.S. PATENT DOCUMENTS

| | | | |
|---|---|---|---|
| 4,732,073 A | | 3/1988 | Semon |
| 4,787,592 A | | 11/1988 | Aoshika |
| 4,983,071 A | * | 1/1991 | Fisk ................. E21B 7/205 138/97 |
| 5,015,023 A | | 5/1991 | Hall |
| 5,076,731 A | * | 12/1991 | Luksch ............... E03F 3/06 138/97 |
| 5,127,481 A | | 7/1992 | Hesse |
| 5,192,165 A | | 3/1993 | Torielli |
| 5,594,977 A | | 1/1997 | Mccallion |
| 5,876,152 A | | 3/1999 | Hesse |
| 5,997,215 A | | 12/1999 | Schwert |
| 6,109,832 A | | 8/2000 | Lincoln |
| 6,305,880 B1 | | 10/2001 | Carter et al. |
| 6,761,507 B2 | | 7/2004 | Wentworth et al. |
| 7,347,129 B1 | | 3/2008 | Youtsey |
| 8,016,830 B2 | | 9/2011 | Veldman et al. |
| 8,721,223 B2 | | 5/2014 | Tjader |
| 9,631,763 B2 | | 4/2017 | Tjader |
| 2002/0081154 A1 | | 6/2002 | Herrick et al. |
| 2002/0081155 A1 | | 6/2002 | Putnam |
| 2002/0114671 A1 | | 8/2002 | Wentworth et al. |
| 2007/0036613 A1 | | 2/2007 | Tjader |
| 2007/0048091 A1 | | 3/2007 | Tjader |
| 2008/0087145 A1 | | 4/2008 | Youtsey |
| 2010/0178113 A1 | | 7/2010 | Tjader |
| 2011/0081205 A1 | | 4/2011 | Tjader |
| 2014/0241813 A1 | | 8/2014 | Tjader |
| 2017/0219156 A1 | | 8/2017 | Tjader |

OTHER PUBLICATIONS

"U.S. Appl. No. 12/897,552, Final Office Action dated May 28, 2013", 6 pgs.

"U.S. Appl. No. 12/897,552, Non Final Office Action dated Dec. 7, 2012", 10 pgs.

"U.S. Appl. No. 12/897,552, Notice of Allowance dated Dec. 23, 2013", 6 pgs.

"U.S. Appl. No. 12/897,552, PTO Response to 312 Amendment dated Apr. 10, 2014", 2 pgs.

"U.S. Appl. No. 12/897,552, Response filed Mar. 7, 2013 to Non Final Office Action dated Dec. 7, 2012", 10 pgs.

"U.S. Appl. No. 12/897,552, Response filed Aug. 28, 2013 to Final Office Action dated May 23, 2013", 11 pgs.

"U.S. Appl. No. 12/897,552, Response filed Sep. 30, 2013 to Final Office Action dated May 28, 2013", 10 pgs.

"U.S. Appl. No. 14/275,385, Advisory Action dated Jan. 9, 2015", 3 pgs.

"U.S. Appl. No. 14/275,385, Decision on Pre-Appeal Brief dated Dec. 8, 2016", 2 pgs.

"U.S. Appl. No. 14/275,385, Final Office Action dated Aug. 8, 2016", 9 pgs.

"U.S. Appl. No. 14/275,385, Final Office Action dated Aug. 27, 2015", 11 pgs.

"U.S. Appl. No. 14/275,385, Final Office Action dated Oct. 8, 2014", 7 pgs.

"U.S. Appl. No. 14/275,385, Non Final Office Action dated Feb. 1, 2016", 8 pgs.

"U.S. Appl. No. 14/275,385, Non Final Office Action dated Mar. 20, 2015", 10 pgs.

"U.S. Appl. No. 14/275,385, Notice of Allowance dated Dec. 20, 2016", 8 pgs.

"U.S. Appl. No. 14/275,385, Pre-Appeal Brief Request For Review Filed Oct. 10, 2016", 5 pgs.

"U.S. Appl. No. 14/275,385, Preliminary Amendment filed Oct. 7, 2014", 5 pgs.

"U.S. Appl. No. 14/275,385, Response filed Jun. 22, 2015 to Non-Final Office Action dated Mar. 20, 2015", 10 pgs.

"U.S. Appl. No. 14/275,385, Response filed Nov. 25, 2015 to Final Office Action dated Aug. 27, 2015", 7 pgs.

"U.S. Appl. No. 14/275,385, Response filed Dec. 5, 2014 to Non Final Office Action dated Oct. 8, 2014", 6 pgs.

"U.S. Appl. No. 14/275,385, Response filed May 2, 2016 to Non-Final Office Action dated Feb. 1, 2016", 7 pgs.

"U.S. Appl. No. 15/490,988 Response filed Jun. 25, 2018 to Final Office Action dated Jan. 25, 2018", 7 pgs.

"U.S. Appl. No. 15/490,988, Corrected Notice of Allowability dated Sep. 7, 2018", 7 pgs.

"U.S. Appl. No. 15/490,988, Final Office Action dated Jan. 25, 2018", 10 pgs.

"U.S. Appl. No. 15/490,988, Non Final Office Action dated Jul. 5, 2017", 11 pgs.

"U.S. Appl. No. 15/490,988, Notice of Allowance dated Jul. 16, 2018", 5 pgs.

"U.S. Appl. No. 15/490,988, Preliminary Amendment filed May 4, 2017", 5 pgs.

"U.S. Appl. No. 15/490,988, Response filed Oct. 5, 2017 to Non-Final Office Action dated Jul. 5, 2017", 9 pgs.

* cited by examiner

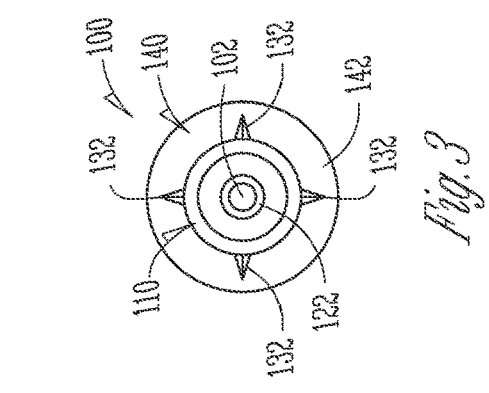
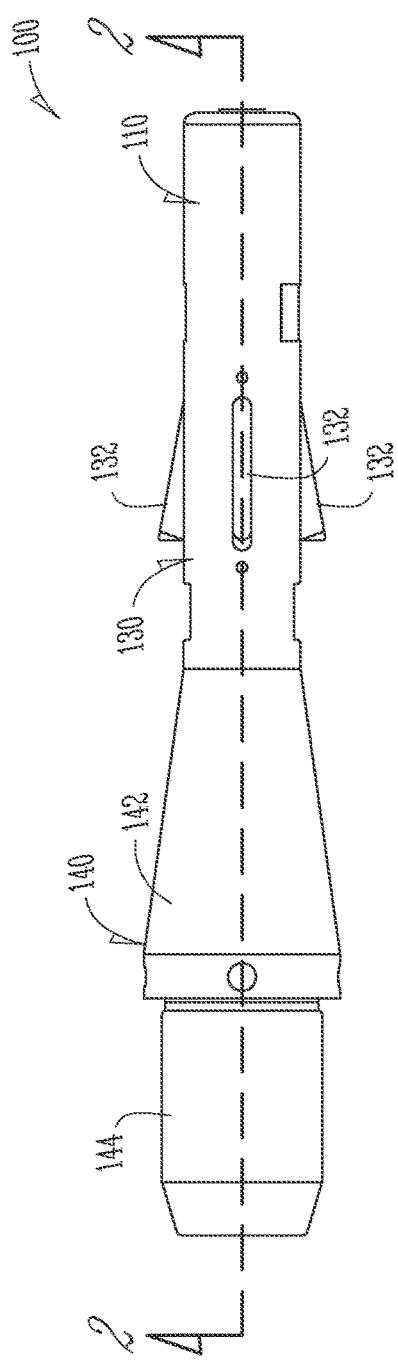
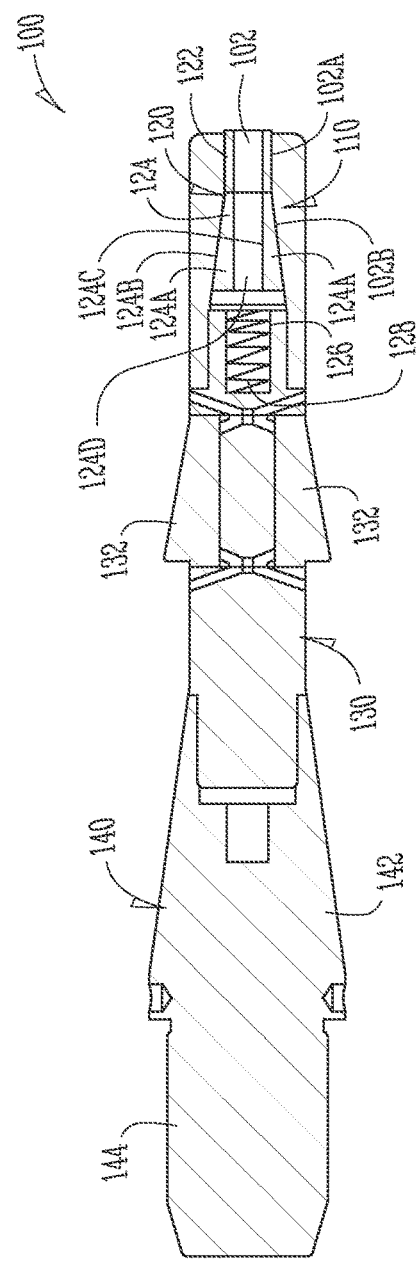

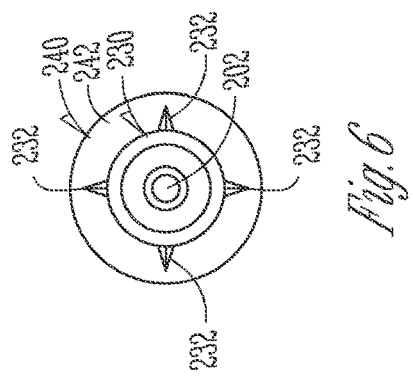
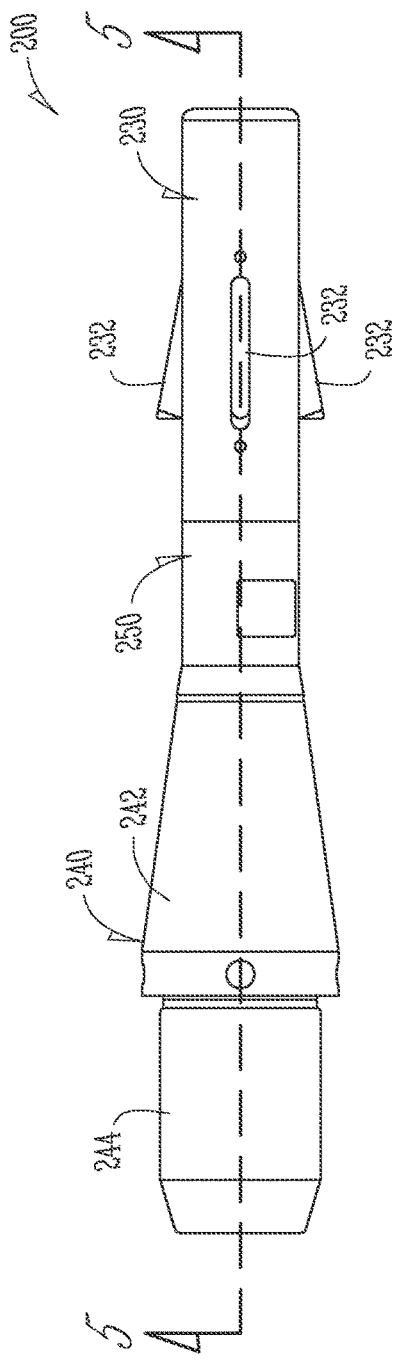
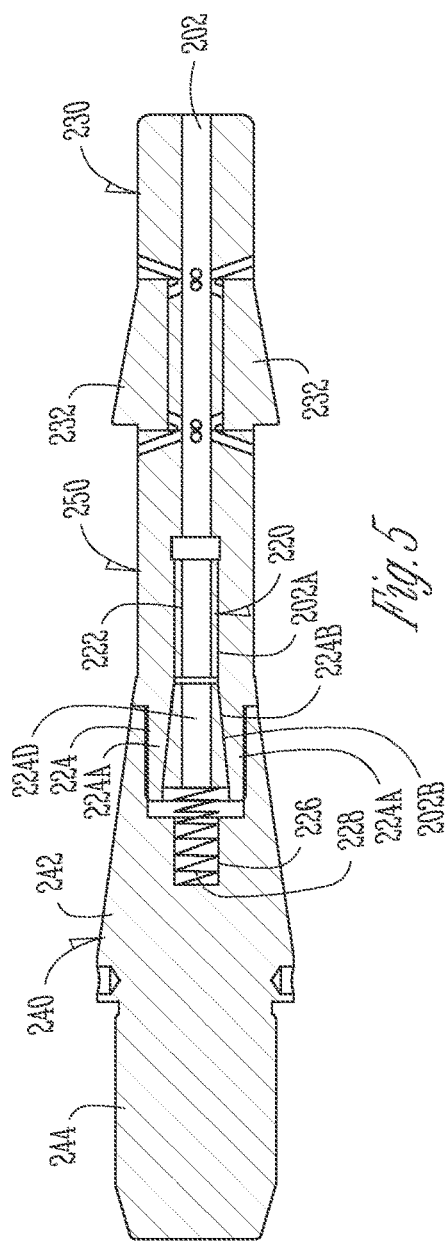

PIPE SPLITTING APPARATUS WITH CABLE ENGAGEMENT SYSTEM

RELATED APPLICATIONS

This patent application is a Continuation of U.S. patent application Ser. No. 15/490,988, filed Apr. 19, 2017, which is a Continuation of U.S. patent application Ser. No. 14/275,385, filed May 12, 2014, now U.S. Pat. No. 9,631,763, which is a Continuation of U.S. patent application Ser. No. 12/897,552, filed Oct. 4, 2010, now U.S. Pat. No. 8,721,223, which claims the benefit of priority, under 35 U.S.C. § 119(e), to U.S. Provisional Patent Application Ser. No. 61/248,753, filed on Oct. 5, 2009, which applications are incorporated herein by reference in their entirety.

TECHNICAL FIELD

This patent document pertains generally to pipe splitting and more particularly, but not by way of limitation, to a pipe splitting apparatus with a cable engagement system.

BACKGROUND

Pipe, such as plastic, copper, lead pipe, and the like, has been used for connecting homes to and creating networks for utilities, for instance, water, sewage, and natural gas. As pipes become older, they break down, crack, develop scaling on interior surfaces that can clog the pipe, and the like and thereby require replacement.

A technique known as pipe bursting is currently used as a convenient method to replace underground pipe without the need to completely excavate the pipe needing replacement. A pipe breaking device, such as an expander or a mole, is pulled by a cable through the existing pipe while it is still underground. The expander is designed to break, split or burst the pipe, and at the same time push the old pipe into the surrounding soil. The expansion of the old pipe allows the expander to pull a replacement pipe into place.

In an example, pipe splitters are pulled through existing piping by an attached cable. Attachment and detachment of the cable to the pipe splitter typically requires disassembly of components that are threaded together and then subsequent reassembly. Often times, the threads of the mating components are further held together with an adhesive material (Loctite®, for instance). As such, these components can be very difficult to separate, and doing so is often made more difficult due to damaged threading from pipe splitting operations and/or from repeated assembly and disassembly of the components. Such disassembly and reassembly can be time consuming and difficult, which increases the time and expense of pipe splitting operations. Also, depending upon the amount of thread damage incurred, the components may require replacement, which further adds to the expense of drilling operations.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 1 is a side elevational view of an example of a pipe splitting apparatus with an example of a cable engagement system;

FIG. 2 is a cross-sectional view of the pipe splitting apparatus of FIG. 1, the cross section taken along line 2-2 in FIG. 1;

FIG. 3 is a front elevational view of the pipe splitting apparatus of FIG. 1;

FIG. 4 is a side elevational view of an example of a pipe splitting apparatus with an example of a cable engagement system;

FIG. 6 is an end view of the pipe splitting apparatus of FIG. 4;

FIG. 5 is a cross-sectional view of the pipe splitting apparatus of FIG. 4, the cross section taken along line 5-5 in FIG. 4;

DESCRIPTION OF THE EMBODIMENTS

Figure 7:
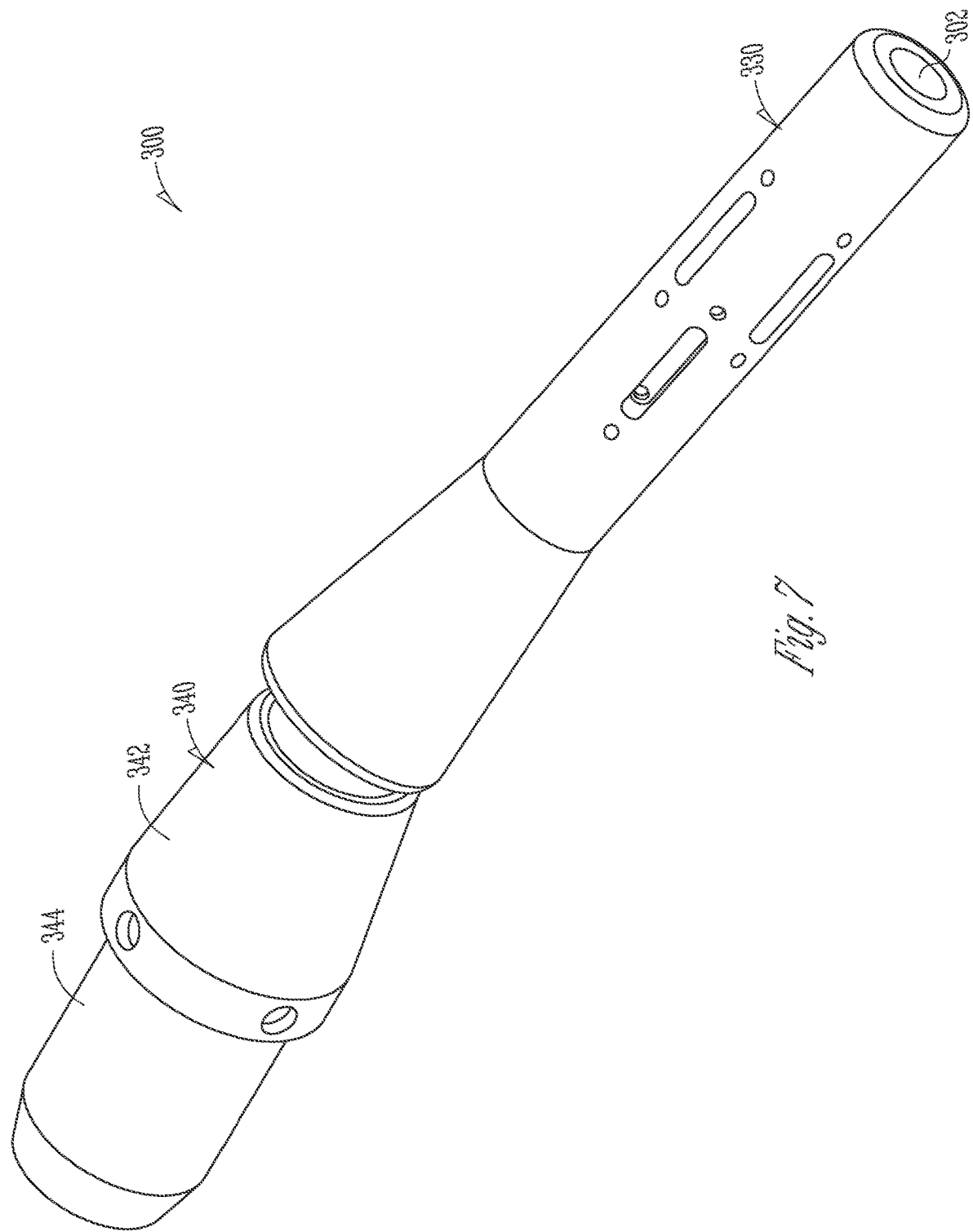
FIG. 7 is side perspective view of an example of a pipe splitting apparatus with an example of a cable engagement system.
Figure 9:
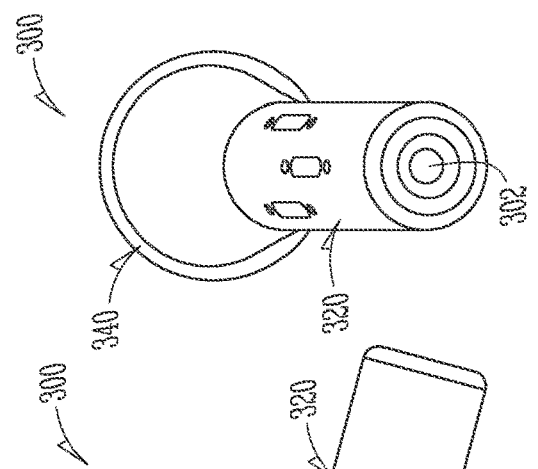
FIG. 9 is a front elevational view of the pipe splitting apparatus of FIG. 7.
Figure 8:
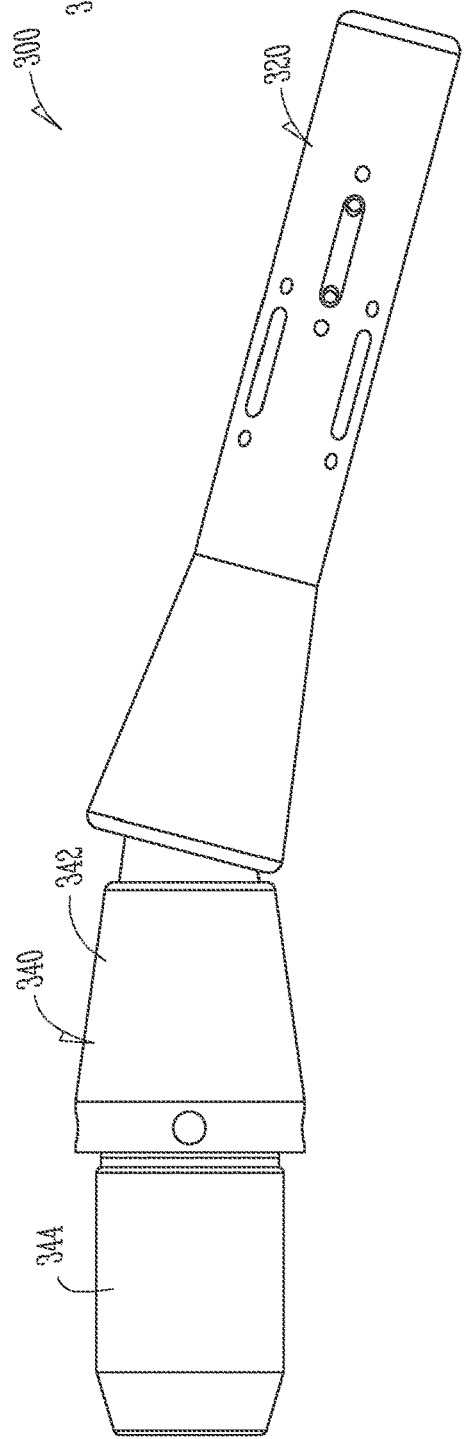
FIG. 8 is a side elevational view of the pipe splitting apparatus of FIG. 7.
Figure 10:
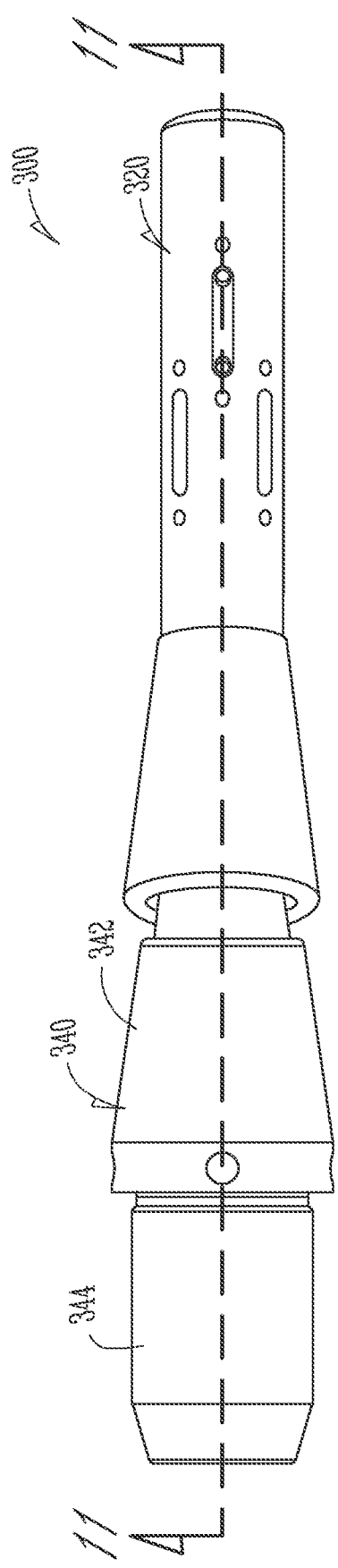
FIG. 10 is a top plan view of the pipe splitting apparatus of FIG. 7.

The present inventor has recognized, among other things, that it is desirable to provide a pipe splitting apparatus including a cable engagement system that allows for relatively easy engagement and disengagement of the cable from the pipe splitting apparatus. The present examples of the cable engagement system allow for relatively quick engagement/disengagement of the cable from the pipe splitting apparatus with little to no disassembly of the pipe splitting apparatus. As such, the present examples of the cable engagement system are thought to be advantageous in that they potentially decrease downtime and expenses incurred during pipe splitting operations.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In the following description, the term cable is defined to include metal cables, wire rope, or other lengths of flexible line of suitable strength to pull devices as described below through a section of pipe. These embodiments are described in sufficient detail to enable those skilled in the art to practice the invention. Other embodiments may be utilized and structural, or logical changes, etc. may be made without departing from the scope of the present invention.

Referring to FIGS. 1-3 and 12-15, an example pipe splitting apparatus 100 is shown. In an example, the pipe splitting apparatus 100 includes a front segment 110, a pilot segment 130, and a nose segment 140. The front segment 110 includes a cable passage 102 configured to accept a cable or wire therein to enable pulling of the pipe splitting apparatus 100 in a pulling operation to split a pipe, conduit, or other object. The pilot segment 130 includes one or more blades 132 extending from an outer surface of the pilot segment 130. The blades, in an example, cut, split, score, scrape, or otherwise act upon the pipe or conduit during a pipe splitting operation. The nose segment 140 includes an expander portion 142, which, in this example, substantially conically expands from a first diameter similar to that of the pilot segment 130 to a second larger diameter, for instance, similar to that of the pneumatic hammer segment. The second diameter, in an example, is large enough to accommodate a replacement pipe or conduit to be advanced. The expander portion 142 functions to further split and/or displace outwardly the existing pipe to allow the replacement pipe or conduit to be advanced through the space previously occupied by the pipe or conduit being replaced. The pipe splitting apparatus 100, in an example, can be coupled to a pneumatic hammer segment, for instance, with a threaded portion 144 of the nose segment 140. The pneumatic hammer segment can be used to assist in urging the pipe splitting apparatus 100 through an existing underground pipe or conduit to be replaced. In an example, the pneumatic hammer segment can be used in addition to pulling the pipe splitting apparatus 100 with the wire or cable extending from the cable passage 102 of the front segment 110. In various examples, one or more of these segments 110, 130, 140 can be used in various combinations and/or used with other types of segments.

In an example, with specific reference to FIG. 2, the pipe splitting apparatus 100 includes a cable retention and release mechanism 120. The cable retention and release mechanism 120 is configured to releasably engage a wire or cable. The cable retention and release mechanism 120, in this example, is disposed within the front segment 110 and the pilot segment 130. The cable retention and release mechanism 120 includes a segment extractor 122 disposed within a substantially tubular portion 102A of the cable passage 102. In an example, the segment extractor 122 is substantially tubular and configured to slide within the substantially tubular portion 102A of the cable passage 102. In a further example, the segment extractor 122 includes at least one o-ring around an outer surface of the segment extractor 122 to create frictional resistance between the segment extractor 122 and the substantially tubular portion of the cable passage 102A to limit, slow, or otherwise retard sliding motion of the segment extractor 122 with respect to the substantially tubular portion 102A of the cable passage 102.

In an example, the cable retention and release mechanism 120 includes a segmented collet 124 disposed within a tapered portion 102B of the cable passage 102. The segmented collet 124, in an example, includes tapered segments 124A. In a further example, the segmented collet 124 includes three tapered segments 124A, which, together, form a substantially frusto-conical segmented collet 124. In another example, the segmented collet 124 includes more or less than three tapered segments 124A, which, together, form a substantially frusto-conical segmented collet 124. In various examples, each tapered segment 124A includes an outer bearing surface 124B configured to abut the tapered portion 102B of the cable passage 102. The outer bearing surface 124B of the collective tapered segments 124A, in some examples, forms a substantially tapered outer surface 124B of the segmented collet 124 corresponding to the tapered portion 102B of the cable passage 102. The tapered segments 124A, in further examples, each include an inner channel surface 124C. The collective channel surfaces 124C of the tapered segments 124B together form a cable channel 124D through the segmented collet 124. In an example, the cable channel 124D is configured to widen with proximal motion of the segmented collet 124 within the tapered portion 102B to allow the cable to pass through the cable channel 124D in a disengaged position of the segmented collet 124. In a further example, the cable channel 124D is configured to narrow with distal motion of the segmented collet 124 within the tapered portion 102B to grip the cable in an engaged position of the segmented collet 124. In this way, proximal motion of the segmented collet 124 within the tapered portion 102B of the cable passage 102 allows the tapered segments 124A to expand outwardly, thereby widening the cable channel 124D through the segmented collet 124 to allow more space for movement of the cable or wire within the cable channel 124D of the segmented collet 124. Conversely, distal motion of the segmented collet 124 within the tapered portion 102B of the cable passage 102 causes the tapered segments 124A to contract inwardly, thereby narrowing the cable channel 124D through the segmented collet 124 to decrease space within the cable channel 124D of the segmented collet 124 to cause the channel surfaces 124C of the segmented collet 124 to bear down or otherwise grip the cable or wire. In an example, the channel surfaces 124C include a gripping pattern to enhance a grip between the channel surfaces 124C and the cable or wire. In an example, the segmented collet 124 includes at least one o-ring around the segmented collet 124 to retain the tapered segments 124A in position to form the segmented collet 124.

In an example, the pilot segment 130 includes a spring pocket 126 disposed proximally from the cable passage 102. In a further example, a spring 128 is disposed within the spring pocket 126 of the pilot segment 130. The spring 128, in this example, is configured to bias the segmented collet 124 distally in the engaged position and inhibit the segmented collet 124 from inadvertently remaining in the disengaged position.

In an example, the segment extractor 122 is configured to abut a distal end of the segmented collet 124. In an example, the segment extractor 122, which is disposed proximate to a front of the front segment 110, is readily accessible to an operator of the pipe splitting apparatus 100. In this way, the segment extractor 122 can be moved proximally by the operator to, in turn, move the segmented collet 124 proximally. In an example, proximal movement of the segment extractor 122 causes the segment extractor 122 to abut the segmented collet 124 (if not already abutting the segmented collet 124) and move the segmented collet 124 proximally to the disengaged position.

Although the cable retention and release mechanism 120 is shown and described with respect to the front and pilot segments 110, 130, in other examples, it is contemplated that the cable retention and release mechanism 120 is disposed within one or more other segments 110, 130, 140 of the pipe splitting apparatus 100 or within other segments of the pipe splitting apparatus 100 not described herein.

Referring now to FIGS. 12-15, the segmented collet 124 is configured to be moved proximally to the disengaged position using an extraction tool 10. The extraction tool 10 includes a handle 12 including a head 14 at a distal end of the handle 12. The head 14 includes an extractor tube 16 extending outwardly from the head 14. In an example, the extractor tube 16 extends from the head 14 in a substantially perpendicular direction with respect to the handle 12. In an example, the extractor tube 16 includes a gap 18, which is configured to accept the cable or wire used for pulling the pipe splitting apparatus 100 to enable the cable or wire to be disposed within the extractor tube 16 during use of the extraction tool 10, as will be described in more detail below.

With further reference to FIGS. 1-3 and 12-15, in operation, to engage the cable or wire with the cable retention and release mechanism 120 of the pipe splitting apparatus 100, the cable or wire is forced proximally with respect to the pipe splitting apparatus 100 through the cable passage 102. The cable or wire passes through the segment extractor 122 and into the cable channel 124D of the segmented collet 124. The proximal motion of the cable or wire causes the segmented collet 124 to move proximally into the disengaged position to allow the cable or wire to move at least partially through the cable channel 124D of the segmented collet 124. Once sufficient surface area of the cable channel 124D is achieved the cable or wire can be pulled distally and/or proximal motion of the cable or wire can be ceased to allow the spring 128 to act against the segmented collet 124 to move the segmented collet 124 distally into the engaged position. In this way, the channel surfaces 124C of the tapered segments 124A of the segmented collet 124 are allowed to grip the cable or wire, thereby engaging the cable or wire within the pipe splitting apparatus 100 to allow the pipe splitting apparatus to be used in pipe splitting operations.

When it is desired to disengage the cable or wire from the cable retention and release mechanism 120, the extraction tool 10 can be placed at the front of the front segment 110 with the cable or wire disposed within the extractor tube 16 and a free end of the extractor tube 16 abutting the segment extractor 122 within the cable passage 102. With distal force applied to the cable or wire (by the operator or by another operator), proximal force is applied to the head 14 and or handle 12 of the tool (for instance, force applied using a hammer) to force the segment extractor and, in turn, the segmented collet 124 proximally, thereby moving the segmented collet 124 into the disengaged position. In an example, several hits with a hammer may be required. Once the segmented collet 124 is moved sufficiently proximally with respect to the tapered portion 102B of the cable passage 102, the grip of the segmented collet 124 is sufficiently lessened to allow the cable or wire to be pulled out of the cable channel 124D of the segmented collet 124 and out from engagement with the cable retention and release mechanism 120 of the pipe splitting apparatus 100.

Although described above as including a segment extractor 122, in other examples, it is contemplated that the cable retention and release mechanism 120 need not include the segment extractor 122. For instance, the segmented collet 124 can be disposed sufficiently distally within the cable passage 102 so that the extraction tool 10 can reach the segmented collet 124 to allow the extraction tool 10 to be used directly against the segmented collet 124 to force the segmented collet 124 into the disengaged position. In another example, the extractor tube 16 can be of a length sufficient to reach the segmented collet 124 if the segmented collet 124 is recessed from a front of the cable passage 102.

Referring to FIGS. 4-6 and 12-15, an example pipe splitting apparatus 200 is shown. In an example, the pipe splitting apparatus 200 includes a pilot segment 230, a segment cartridge 250, and a nose segment 240. The pilot segment 230 includes a cable passage 202 configured to accept a cable or wire therein to enable pulling of the pipe splitting apparatus 200 in a pulling operation to split a pipe, conduit, or other object. The pilot segment 230 includes one or more blades 232 extending from an outer surface of the pilot segment 230. The blades, in an example, cut, split, score, scrape, or otherwise act upon the pipe or conduit during a pipe splitting operation. The nose segment 240 includes an expander portion 242, which, in this example, substantially conically expands from a first diameter similar to that of the segment cartridge 250 to a second larger diameter, for instance, similar to that of the pneumatic hammer segment. The second diameter, in an example, is large enough to accommodate a replacement pipe or conduit to be advanced. The expander portion 242 functions to further split and/or displace outwardly the existing pipe to allow the replacement pipe or conduit to be advanced through the space previously occupied by the pipe or conduit being replaced. The pipe splitting apparatus 200, in an example, can be coupled to a pneumatic hammer segment, for instance, with a threaded portion 244 of the nose segment 240. The pneumatic hammer segment can be used to assist in urging the pipe splitting apparatus 200 through an existing underground pipe or conduit to be replaced. In an example, the pneumatic hammer segment can be used in addition to pulling the pipe splitting apparatus 200 with the wire or cable extending from the cable passage 202 of the pilot segment 230. In an example, the pilot segment 230 and the segment cartridge 250 include complementary rounded abutting surfaces to allow an amount of angular movement of the pilot segment 230 with respect to the segment cartridge 250. In various examples, one or more of these segments 230, 250, 240 can be used in various combinations and/or used with other types of segments.

In an example, with specific reference to FIG. 5, the pipe splitting apparatus 200 includes a cable retention and release mechanism 220. The cable retention and release mechanism 220 is configured to releasably engage a wire or cable. The cable retention and release mechanism 220, in this example, is disposed within the segment cartridge 250. The cable retention and release mechanism 220 includes a segment extractor 222 disposed within a substantially tubular portion 202A of the cable passage 202. In an example, the segment extractor 222 is substantially tubular and configured to slide within the substantially tubular portion 202A of the cable passage 202. In a further example, the segment extractor 222 includes at least one o-ring around an outer surface of the segment extractor 222 to create frictional resistance between the segment extractor 222 and the substantially tubular portion of the cable passage 202A to limit, slow, or otherwise retard sliding motion of the segment extractor 222 with respect to the substantially tubular portion 202A of the cable passage 202.

In an example, the cable retention and release mechanism 220 includes a segmented collet 224 disposed within a tapered portion 202B of the cable passage 202. The segmented collet 224, in an example, includes tapered segments 224A. In a further example, the segmented collet 224 includes three tapered segments 224A, which, together, form a substantially frusto-conical segmented collet 224. In another example, the segmented collet 224 includes more or less than three tapered segments 224A, which, together, form a substantially frusto-conical segmented collet 224. In various examples, each tapered segment 224A includes an outer bearing surface 224B configured to abut the tapered portion 202B of the cable passage 202. The outer bearing surface 224B of the collective tapered segments 224A, in some examples, forms a substantially tapered outer surface 224B of the segmented collet 224 corresponding to the tapered portion 202B of the cable passage 202. The tapered segments 224A, in further examples, each include an inner channel surface 224C. The collective channel surfaces 224C of the tapered segments 224B together form a cable channel 224D through the segmented collet 224. In an example, the cable channel 224D is configured to widen with proximal motion of the segmented collet 224 within the tapered portion 202B to allow the cable to pass through the cable channel 224D in a disengaged position of the segmented collet 224. In a further example, the cable channel 224D is configured to narrow with distal motion of the segmented collet 224 within the tapered portion 202B to grip the cable in an engaged position of the segmented collet 224. In this way, proximal motion of the segmented collet 224 within the tapered portion 202B of the cable passage 202 allows the tapered segments 224A to expand outwardly, thereby widening the cable channel 224D through the segmented collet 224 to allow more space for movement of the cable or wire within the cable channel 224D of the segmented collet 224. Conversely, distal motion of the segmented collet 224 within the tapered portion 202B of the cable passage 202 causes the tapered segments 224A to contract inwardly, thereby narrowing the cable channel 224D through the segmented collet 224 to decrease space within the cable channel 224D of the segmented collet 224 to cause the channel surfaces 224C of the segmented collet 224 to bear down or otherwise grip the cable or wire. In an example, the channel surfaces 224C include a gripping pattern to enhance a grip between the channel surfaces 224C and the cable or wire. In an example, the segmented collet 224 includes at least one o-ring around the segmented collet 224 to retain the tapered segments 224A in position to form the segmented collet 224.

In an example, the segment cartridge 250 includes a spring pocket 226 disposed proximally from the cable passage 202. In a further example, a spring 228 is disposed within the spring pocket 226 of the segment cartridge 250. The spring 228, in this example, is configured to bias the segmented collet 224 distally in the engaged position and inhibit the segmented collet 224 from inadvertently remaining in the disengaged position.

In an example, the segment extractor 222 is configured to abut a distal end of the segmented collet 224. In an example, the segment extractor 222, which is disposed proximate to a front of the segment cartridge 250, is readily accessible to an operator of the pipe splitting apparatus 200 once the pilot segment 230 is slid proximally along the cable or wire and out of abutting relation with the segment cartridge 250. In this way, the segment extractor 222 can be moved proximally by the operator to, in turn, move the segmented collet 224 proximally. In an example, proximal movement of the segment extractor 222 causes the segment extractor 222 to abut the segmented collet 224 (if not already abutting the segmented collet 224) and move the segmented collet 224 proximally to the disengaged position.

Although the cable retention and release mechanism 220 is shown and described with respect to the segment cartridge 250, in other examples, it is contemplated that the cable retention and release mechanism 220 is disposed within one or more other segments 230, 250, 240 of the pipe splitting apparatus 200 or within other segments of the pipe splitting apparatus 200 not described herein.

Referring now to FIGS. 12-15, the segmented collet 224 is configured to be moved proximally to the disengaged position using an extraction tool 10. The extraction tool 10 includes a handle 12 including a head 14 at a distal end of the handle 12. The head 14 includes an extractor tube 16 extending outwardly from the head 14. In an example, the extractor tube 16 extends from the head 14 in a substantially perpendicular direction with respect to the handle 12. In an example, the extractor tube 16 includes a gap 18, which is configured to accept the cable or wire used for pulling the pipe splitting apparatus 200 to enable the cable or wire to be disposed within the extractor tube 16 during use of the extraction tool 10, as will be described in more detail below.

With further reference to FIGS. 4-6 and 12-15, in operation, to engage the cable or wire with the cable retention and release mechanism 220 of the pipe splitting apparatus 200, the cable or wire is threaded through the pilot segment 230 and is forced proximally with respect to the pipe splitting apparatus 200 through the cable passage 202 of the segment cartridge 250. The cable or wire passes through the segment extractor 222 and into the cable channel 224D of the segmented collet 224. The proximal motion of the cable or wire causes the segmented collet 224 to move proximally into the disengaged position to allow the cable or wire to move at least partially through the cable channel 224D of the segmented collet 224. Once sufficient surface area of the cable channel 224D is achieved the cable or wire can be pulled distally and/or proximal motion of the cable or wire can be ceased to allow the spring 228 to act against the segmented collet 224 to move the segmented collet 224 distally into the engaged position. In this way, the channel surfaces 224C of the tapered segments 224A of the segmented collet 224 are allowed to grip the cable or wire, thereby engaging the cable or wire within the pipe splitting apparatus 200 to allow the pipe splitting apparatus to be used in pipe splitting operations.

When it is desired to disengage the cable or wire from the cable retention and release mechanism 220, the pilot segment 230 can be slid distally along the cable or wire and out of abutting engagement with the segment cartridge 250. The extraction tool 10 can be placed at the front of the segment cartridge 250 with the cable or wire disposed within the extractor tube 16 and a free end of the extractor tube 16 abutting the segment extractor 222 within the cable passage 202. With distal force applied to the cable or wire (by the operator or by another operator), proximal force is applied to the head 14 and or handle 12 of the tool (for instance, force applied using a hammer) to force the segment extractor and, in turn, the segmented collet 224 proximally, thereby moving the segmented collet 224 into the disengaged position. In an example, several hits with a hammer may be required. Once the segmented collet 224 is moved sufficiently proximally with respect to the tapered portion 202B of the cable passage 202, the grip of the segmented collet 224 is sufficiently lessened to allow the cable or wire to be pulled out of the cable channel 224D of the segmented collet 224 and out from engagement with the cable retention and release mechanism 220 of the pipe splitting apparatus 200.

Although described above as including a segment extractor 222, in other examples, it is contemplated that the cable retention and release mechanism 220 need not include the segment extractor 222. For instance, the segmented collet 224 can be disposed sufficiently distally within the cable passage 202 so that the extraction tool 10 can reach the segmented collet 224 to allow the extraction tool 10 to be used directly against the segmented collet 224 to force the segmented collet 224 into the disengaged position. In another example, the extractor tube 16 can be of a length sufficient to reach the segmented collet 224 if the segmented collet 224 is recessed from a front of the cable passage 202.

Referring to FIGS. 7-15, an example pipe splitting apparatus 300 is shown. In an example, the pipe splitting apparatus 300 includes a pilot segment 330 and a nose segment 340. The pilot segment 330 includes a cable passage 302 configured to accept a cable or wire therein to enable pulling of the pipe splitting apparatus 300 in a pulling operation to split a pipe, conduit, or other object. The pilot segment 330 includes one or more blades extending from an outer surface of the pilot segment 330. The blades, in an example, cut, split, score, scrape, or otherwise act upon the pipe or conduit during a pipe splitting operation. The nose segment 340 includes an expander portion 342, which, in this example, substantially conically expands from a first diameter similar to that of the pilot segment 330 to a second larger diameter, for instance, similar to that of the pneumatic hammer segment. The second diameter, in an example, is large enough to accommodate a replacement pipe or conduit to be advanced. The expander portion 342 functions to further split and/or displace outwardly the existing pipe to allow the replacement pipe or conduit to be advanced through the space previously occupied by the pipe or conduit being replaced. The pipe splitting apparatus 300, in an example, can be coupled to a pneumatic hammer segment, for instance, with a threaded portion 344 of the nose segment 340. The pneumatic hammer segment can be used to assist in urging the pipe splitting apparatus 300 through an existing underground pipe or conduit to be replaced. In an example, the pneumatic hammer segment can be used in addition to pulling the pipe splitting apparatus 300 with the wire or cable extending from the cable passage 302 of the pilot segment 330. In an example, the pilot segment 330 and the nose segment 340 include complementary rounded abutting surfaces to allow an amount of angular movement of the pilot segment 330 with respect to the nose segment 340, as shown in FIGS. 7-11. In various examples, one or more of these segments 330, 340 can be used in various combinations and/or used with other types of segments.

Figure 11:
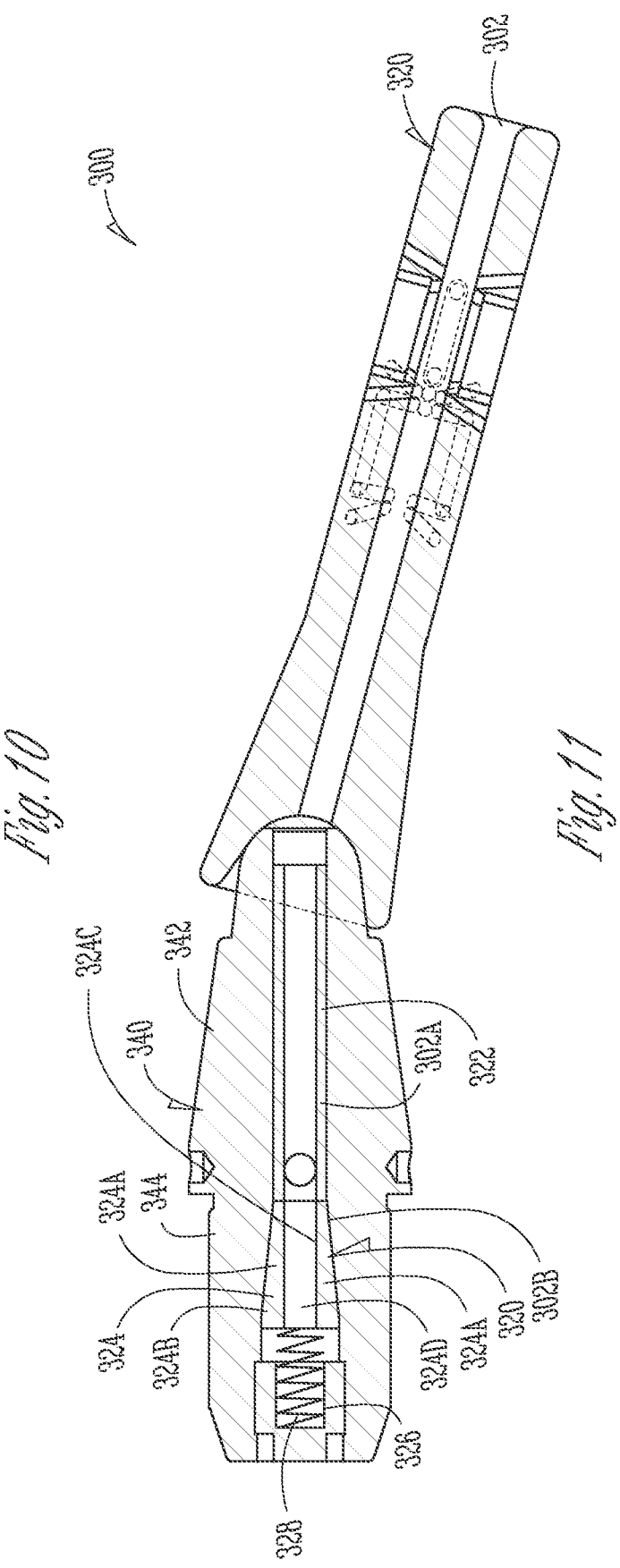
FIG. 11 is a cross-sectional view of the pipe splitting apparatus of FIG. 7, the cross section taken along line 11-11 in FIG. 10.
Figure 12:
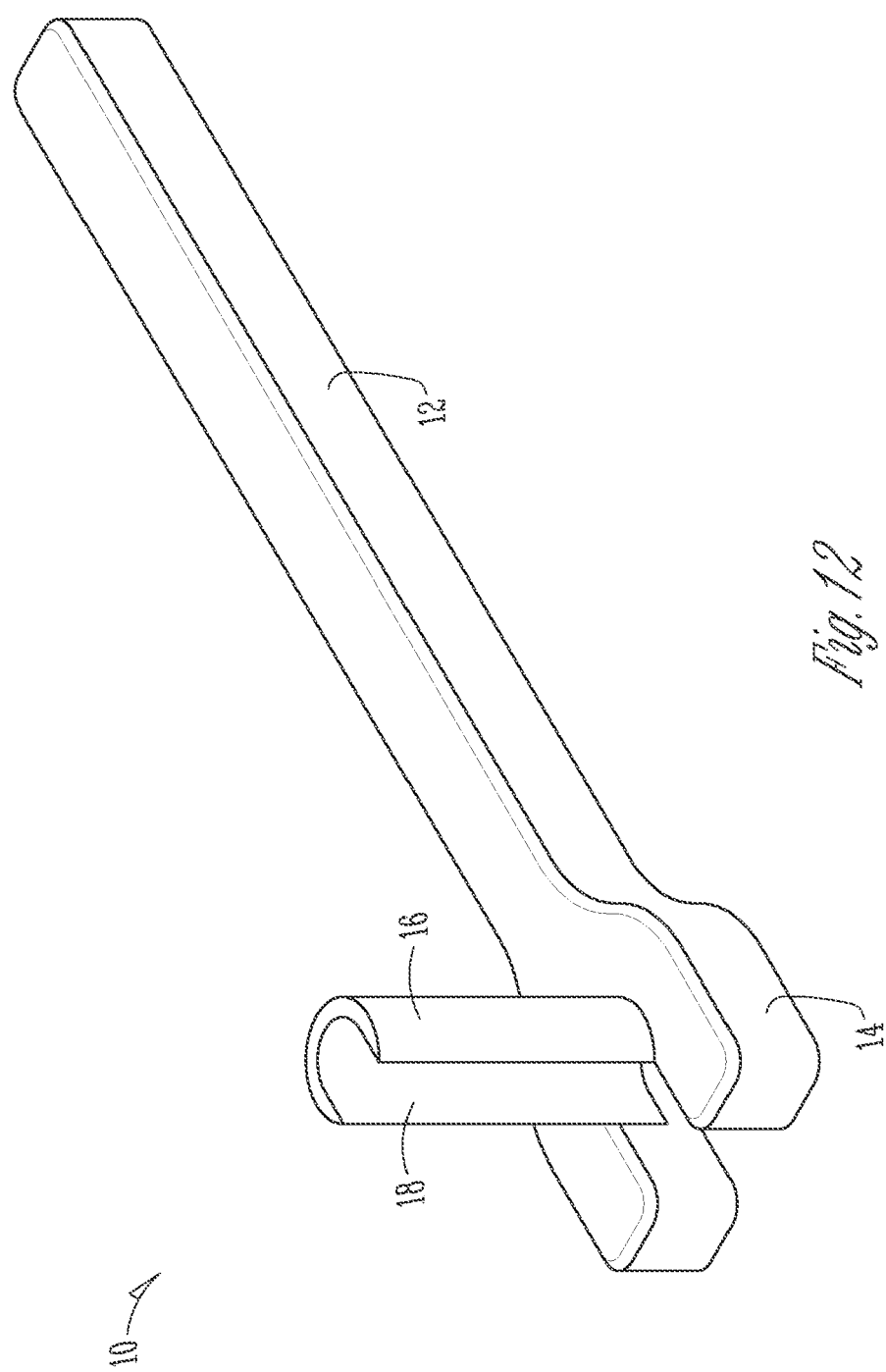
FIG. 12 is a side perspective view of an example of an extraction tool for removal of a cable from examples of pipe splitting apparatuses with examples of cable engagement systems.
Figure 13:
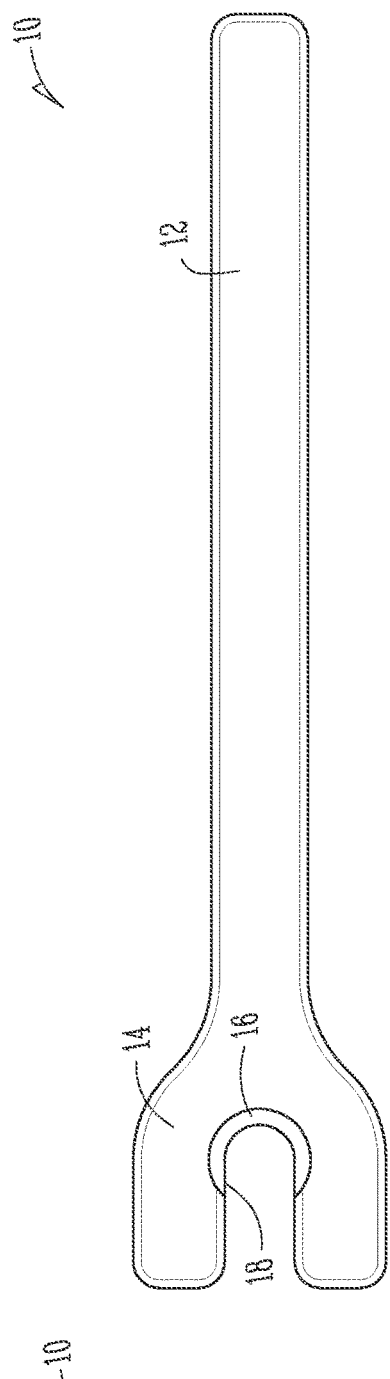
FIG. 13 is a top plan view of the extraction tool of FIG. 12.
Figure 14:
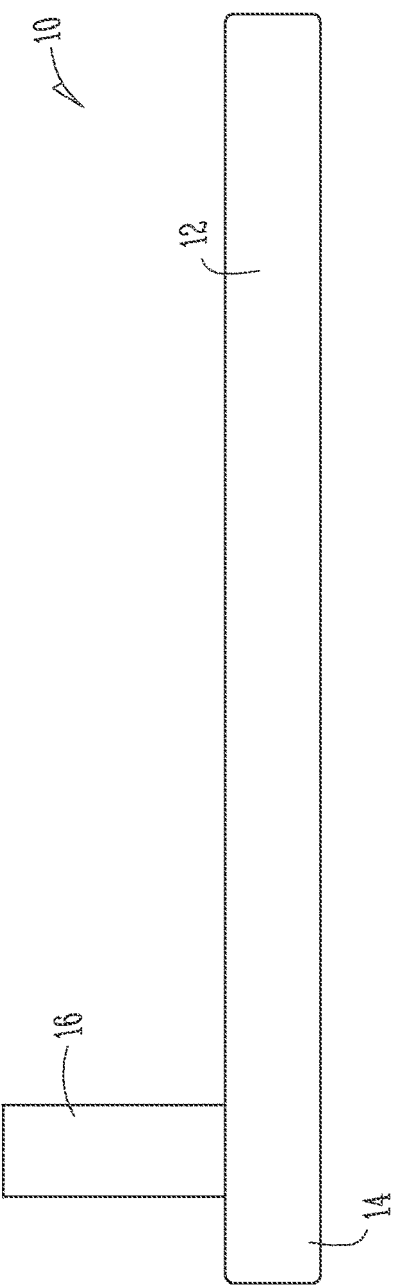
FIG. 14 is a side elevational view of the extraction tool of FIG. 12.
Figure 15:
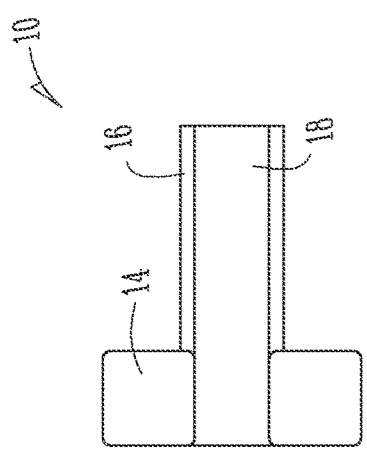
FIG. 15 is a front elevational view of the extraction tool of FIG. 12.

In an example, with specific reference to FIG. 11, the pipe splitting apparatus 300 includes a cable retention and release mechanism 320. The cable retention and release mechanism 320 is configured to releasably engage a wire or cable. The cable retention and release mechanism 320, in this example, is disposed within the nose segment 340. The cable retention and release mechanism 320 includes a segment extractor 322 disposed within a substantially tubular portion 302A of the cable passage 302. In an example, the segment extractor 322 is substantially tubular and configured to slide within the substantially tubular portion 302A of the cable passage 302. In a further example, the segment extractor 322 includes at least one o-ring around an outer surface of the segment extractor 322 to create frictional resistance between the segment extractor 322 and the substantially tubular portion of the cable passage 302A to limit, slow, or otherwise retard sliding motion of the segment extractor 322 with respect to the substantially tubular portion 302A of the cable passage 302.

In an example, the cable retention and release mechanism 320 includes a segmented collet 324 disposed within a tapered portion 302B of the cable passage 302. The segmented collet 324, in an example, includes tapered segments 324A. In a further example, the segmented collet 324 includes three tapered segments 324A, which, together, form a substantially frusto-conical segmented collet 324. In another example, the segmented collet 324 includes more or less than three tapered segments 324A, which, together, form a substantially frusto-conical segmented collet 324. In various examples, each tapered segment 324A includes an outer bearing surface 324B configured to abut the tapered portion 302B of the cable passage 302. The outer bearing surface 324B of the collective tapered segments 324A, in some examples, forms a substantially tapered outer surface 324B of the segmented collet 324 corresponding to the tapered portion 302B of the cable passage 302. The tapered segments 324A, in further examples, each include an inner channel surface 324C. The collective channel surfaces 324C of the tapered segments 324B together form a cable channel 324D through the segmented collet 324. In an example, the cable channel 324D is configured to widen with proximal motion of the segmented collet 324 within the tapered portion 302B to allow the cable to pass through the cable channel 324D in a disengaged position of the segmented collet 324. In a further example, the cable channel 324D is configured to narrow with distal motion of the segmented collet 324 within the tapered portion 302B to grip the cable in an engaged position of the segmented collet 324. In this way, proximal motion of the segmented collet 324 within the tapered portion 302B of the cable passage 302 allows the tapered segments 324A to expand outwardly, thereby widening the cable channel 324D through the segmented collet 324 to allow more space for movement of the cable or wire within the cable channel 324D of the segmented collet 324. Conversely, distal motion of the segmented collet 324 within the tapered portion 302B of the cable passage 302 causes the tapered segments 324A to contract inwardly, thereby narrowing the cable channel 324D through the segmented collet 324 to decrease space within the cable channel 324D of the segmented collet 324 to cause the channel surfaces 324C of the segmented collet 324 to bear down or otherwise grip the cable or wire. In an example, the channel surfaces 324C include a gripping pattern to enhance a grip between the channel surfaces 324C and the cable or wire. In an example, the segmented collet 324 includes at least one o-ring around the segmented collet 324 to retain the tapered segments 324A in position to form the segmented collet 324.

In an example, the nose segment 340 includes a spring pocket 326 disposed proximally from the cable passage 302. In a further example, a spring 328 is disposed within the spring pocket 326 of the nose segment 340. The spring 328, in this example, is configured to bias the segmented collet 324 distally in the engaged position and inhibit the segmented collet 324 from inadvertently remaining in the disengaged position.

In an example, the segment extractor 322 is configured to abut a distal end of the segmented collet 324. In an example, the segment extractor 322, which is disposed proximate to a front of the nose segment 340, is readily accessible to an operator of the pipe splitting apparatus 300 once the pilot segment 330 is slid proximally along the cable or wire and out of abutting relation with the nose segment 340. In this way, the segment extractor 322 can be moved proximally by the operator to, in turn, move the segmented collet 324 proximally. In an example, proximal movement of the segment extractor 322 causes the segment extractor 322 to abut the segmented collet 324 (if not already abutting the segmented collet 324) and move the segmented collet 324 proximally to the disengaged position.

Although the cable retention and release mechanism 320 is shown and described with respect to the nose segment 340, in other examples, it is contemplated that the cable retention and release mechanism 320 is disposed within the pilot segment 330 of the pipe splitting apparatus 200, within both of the pilot and nose segments 330, 340, or within other segments of the pipe splitting apparatus 300 not described herein.

Referring now to FIGS. 12-15, the segmented collet 324 is configured to be moved proximally to the disengaged position using an extraction tool 10. The extraction tool 10 includes a handle 12 including a head 14 at a distal end of the handle 12. The head 14 includes an extractor tube 16 extending outwardly from the head 14. In an example, the extractor tube 16 extends from the head 14 in a substantially perpendicular direction with respect to the handle 12. In an example, the extractor tube 16 includes a gap 18, which is configured to accept the cable or wire used for pulling the pipe splitting apparatus 300 to enable the cable or wire to be disposed within the extractor tube 16 during use of the extraction tool 10, as will be described in more detail below.

With further reference to FIGS. 7-15, in operation, to engage the cable or wire with the cable retention and release mechanism 320 of the pipe splitting apparatus 300, the cable or wire is threaded through the pilot segment 330 and is forced proximally with respect to the pipe splitting apparatus 300 through the cable passage 302 of the nose segment 340. The cable or wire passes through the segment extractor 322 and into the cable channel 324D of the segmented collet 324. The proximal motion of the cable or wire causes the segmented collet 324 to move proximally into the disengaged position to allow the cable or wire to move at least partially through the cable channel 324D of the segmented collet 324. Once sufficient surface area of the cable channel 324D is achieved the cable or wire can be pulled distally and/or proximal motion of the cable or wire can be ceased to allow the spring 328 to act against the segmented collet 324 to move the segmented collet 324 distally into the engaged position. In this way, the channel surfaces 324C of the tapered segments 324A of the segmented collet 324 are allowed to grip the cable or wire, thereby engaging the cable or wire within the pipe splitting apparatus 300 to allow the pipe splitting apparatus to be used in pipe splitting operations.

When it is desired to disengage the cable or wire from the cable retention and release mechanism 320, the pilot segment 330 can be slid distally along the cable or wire and out of abutting engagement with the nose segment 340. The extraction tool 10 can be placed at the front of the nose segment 340 with the cable or wire disposed within the extractor tube 16 and a free end of the extractor tube 16 abutting the segment extractor 322 within the cable passage 302. With distal force applied to the cable or wire (by the operator or by another operator), proximal force is applied to the head 14 and or handle 12 of the tool (for instance, force applied using a hammer) to force the segment extractor and, in turn, the segmented collet 324 proximally, thereby moving the segmented collet 324 into the disengaged position. In an example, several hits with a hammer may be required. Once the segmented collet 324 is moved sufficiently proximally with respect to the tapered portion 302B of the cable passage 302, the grip of the segmented collet 324 is sufficiently lessened to allow the cable or wire to be pulled out of the cable channel 324D of the segmented collet 324 and out from engagement with the cable retention and release mechanism 320 of the pipe splitting apparatus 300.

Although described above as including a segment extractor 322, in other examples, it is contemplated that the cable retention and release mechanism 320 need not include the segment extractor 322. For instance, the segmented collet 324 can be disposed sufficiently distally within the cable passage 302 so that the extraction tool 10 can reach the segmented collet 324 to allow the extraction tool 10 to be used directly against the segmented collet 324 to force the segmented collet 324 into the disengaged position. In another example, the extractor tube 16 can be of a length sufficient to reach the segmented collet 324 if the segmented collet 324 is recessed from a front of the cable passage 302.

In this way, the examples of cable retention and release mechanisms 120, 220, 320 are believed to allow for relatively easy engagement and disengagement of the cable from the pipe splitting apparatus 100, 200, 300. The examples of the cable retention and release mechanisms 120, 220, 320 allow for relatively quick engagement/disengagement of the cable from the pipe splitting apparatus 100, 200, 300 with little to no disassembly of the pipe splitting apparatus 100, 200, 300. In this way, the examples of the cable retention and release mechanisms 120, 220, 320 are thought to be advantageous in that they potentially decrease downtime and expenses incurred during pipe splitting operations.

Other examples of collet engagement systems are shown and described in U.S. Provisional Application Ser. No. 61/144,064, filed on Jan. 12, 2009, which application is incorporated herein by reference.

CONCLUSION

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A pipe breaking assembly, comprising:
   an expander;

a coupling attached to the expander portion, the coupling adapted to connect to a pneumatic hammer;

a cable gripping anchor located behind the expander; and a segment extractor in contact with a front end of the cable gripping anchor.

2. The pipe breaking assembly of claim 1, wherein the coupling is a threaded coupling.

3. The pipe breaking assembly of claim 1, wherein the cable gripping anchor includes a number of tapered anchor jaws.

4. The pipe breaking assembly of claim 1, further including one or more cutting blades located in front of the expander.

5. The pipe breaking assembly of claim 1, wherein the cable gripping anchor is located within the coupling.

6. A pipe breaking assembly, comprising:

a pilot segment;

an expander located behind the pilot segment;

a coupling attached to the expander portion, the coupling adapted to connect to a pneumatic hammer;

a cable gripping anchor located behind the expander; and a segment extractor in contact with a front end of the cable gripping anchor.

7. The pipe breaking device of claim 6, wherein the cable gripping anchor is located within the coupling.

8. The pipe breaking assembly of claim 6, wherein the coupling is a threaded coupling.

9. The pipe breaking device of claim 6, wherein the segment extractor is substantially tubular and configured to slide within a substantially tubular portion of the pipe breaking device, wherein proximal movement of the segment extractor causes the segment extractor to abut the cable gripping anchor and move the cable gripping anchor to a disengaged position.

10. The pipe breaking device of claim 6, further including at least one splitting blade located on the pilot segment.

11. The pipe breaking device of claim 10, wherein the at least one splitting blade includes four splitting blades arranged at substantially 90 degrees to one another about the pilot segment.

12. The pipe breaking device of claim 6, further including a ball and socket joint between the pilot segment and the expander.

* * * * *